(12) United States Patent
Galvin

(10) Patent No.: US 6,814,241 B1
(45) Date of Patent: Nov. 9, 2004

(54) REFLUX CLASSIFIER

(75) Inventor: Kevin Patrick Galvin, New South Wales (AU)

(73) Assignee: The University of Newcastle Research Associates Limited (AU)

(*) Notice: Subject to any disclaimer, the term of this patent is extended or adjusted under 35 U.S.C. 154(b) by 0 days.

(21) Appl. No.: 09/890,487

(22) PCT Filed: Feb. 2, 2000

(86) PCT No.: PCT/AU00/00058

§ 371 (c)(1),
(2), (4) Date: Oct. 23, 2001

(87) PCT Pub. No.: WO00/45959

PCT Pub. Date: Aug. 10, 2000

(30) Foreign Application Priority Data

Feb. 2, 1999 (AU) .............................. PP8481

(51) Int. Cl.[7] .............................. B03B 5/66
(52) U.S. Cl. .................. 209/158; 209/159; 209/458
(58) Field of Search ................. 209/155, 158, 209/159, 208, 210, 458, 460

(56) References Cited

U.S. PATENT DOCUMENTS

| 2,426,839 | A | * | 9/1947 | Morris | .................. 209/158 X |
| 3,190,729 | A | * | 6/1965 | Emmett et al. | ......... 209/158 X |
| 3,688,901 | A | * | 9/1972 | Laurenty | ................ 209/155 X |
| 4,493,735 | A | | 1/1985 | Flaschel et al. | |

FOREIGN PATENT DOCUMENTS

| AT | 200083 | * 10/1958 | ................. 209/158 |
| CA | 554038 | * 3/1958 | ................. 209/158 |
| RU | 2083289 | 7/1997 | ...................... 5/62 |
| SU | 1351674 | 11/1987 | |

OTHER PUBLICATIONS

Derwent Abstract Accession No. 92–207402/25, (MOSC Tool–Making Inst.), Jul. 30, 1991.

* cited by examiner

Primary Examiner—Donald P. Walsh
Assistant Examiner—Matthew J. Kohner
(74) Attorney, Agent, or Firm—Ostrolenk, Faber, Gerb & Soffen, LLP

(57) ABSTRACT

A reflux classifier for segregating particles by size or density using a fluidized bed in a chamber. Arrays of inclined plates form lamellae and divide the chamber into zones into which particles of predetermined size or density migrate. Particle differentiation is controlled by plate length, inclination and spacing in each array, combined with fluidization rate.

10 Claims, 5 Drawing Sheets

REFLUX CLASSIFIER

TECHNICAL FIELD

The present invention relates generally to a method or an apparatus for segregating or classifying particles. The invention relates particularly, though not exclusively, to a fluidized multistage lamellae classifier, particle fractionator or reflux classifier, being designed for segregating particles according to size or density.

BACKGROUND OF THE INVENTION

In many industrial processes it is necessary to classify particles according to their size, and sometimes according to their density. For example, in mineral processing, screens, cyclones, and elutriators are often used to sort particles prior to downstream beneficiation. Classification may proceed either in a wet or a dry state. Although the aim may be to separate the particles at 2 specific size, there is usually a high degree of so-called misplaced material, with a portion of coarse particles reporting with the fine particle stream. An "S" shape partition curve provides a measure of the probability of a given particle size reporting to a given stream, and hence the efficiency of the separation.

In principle, sieves should provide the perfect separation, given that a particle will only pass through sieve if it is smaller than the openings. However, if the particles are not given sufficient time on the sieve a poor separation will be achieved. Relatively fine particles, less than 45 $\mu$m in diameter, readily adhere to other particles, and are therefore difficult to separate using sieves. Sieves also tend to become blinded by particles which are similar in size to the openings, and operate poorly when particles are fed on a continuous basis.

Elutriators separate particles according to their settling velocity. If the particles are of the same density, then the separation proceeds in accordance with the particle size. A liquid passes up through the vessel at a specific velocity, carrying slower settling particles to the top, thus allowing faster moving particles to be withdrawn from near the base of the vessel. However, elutriators fail to provide satisfactory throughputs, especially when the separation size is relatively small. On the other hand cyclones provide remarkably high throughputs although their efficiency is arguably poorer, and the separation size more difficult to control.

Inclined classifier have the potential to offer satisfactory throughputs, and efficient separations. Earlier this century Boycott (1920) found that the effective rate of sedimentation could be increased significantly by inclining a vessel. Lamellae thickeners, which are gravity settlers containing parallel plates, are now used in solid liquid separation. However with these known systems there is no attempt to classify particles, only to remove all particles from much of the liquid. Basically the solids settle onto the plates once only and move downwards as a concentrate. In laboratories, inclined devices have also been used to classify particles according to both size and density.

SUMMARY OF THE INVENTION

According to one aspect of the present invention there is provided a classifier for segregating particles by size or density, said classifier comprising:

a fluidization chamber adapted to contain a fluidized bed;

fluidization means adapted to provide a flow of fluidization fluid into the fluidization chamber; and one or mote inclined plates mounted within the fluidization chamber positioned such that in use, particles elutriated by the fluidization fluid within the chamber are caused to be segregated above or below the plates according to their size or density.

Preferably, said one or more inclined plates comprises at least one array of inclined plates.

Preferably, said array of inclined plates comprises an array parallel equally spaced plates.

Preferably, said array of plates extends substantially horizontally across said fluidization chamber.

Preferably, two or more arrays of inclined plates are provided, each array being vertically spaced from the or each other array, and dividing the fluidization chamber into zones.

Preferably, the length of each plate in an array, the angle of inclination of the plates, and the spacing between plates in that array are selected to enable particles of a predetermined size or density to pass through the array when elutriated at a predetermined rate by the fluidization fluid, while inhibiting particles of greater size or density from passing through the array.

In one form of the invention a feed fluid incorporating particles to be classified is fed into the fluidization chamber between two said arrays of inclined plates.

In another form of the invention the particles are fed into the fluidization chamber with the fluidization fluid.

According to another aspect of the present invention there is provided a method of classifying particles by size or density, said method comprising the steps of:

providing a fluidized bed within a fluidization chamber in which is positioned one or more inclined plates;

feeding the particles into the fluidized bed; and withdrawing particles from the chamber at one or more predetermined locations.

Preferably, the chamber is provided with two or more arrays of said inclined plates, each array being vertically spaced from the or each other array thereby dividing the fluidization chamber into zones, and wherein the withdrawal of particles from the chamber comprises withdrawal from a selected one or more of said zones.

Preferably, said fluidized bed is provided with fluidization fluid at a predetermined rate so as to achieve desired separation of sizes or densities above and below said inclined plates in combination with selected sizes, inclination and spacings of said inclined plates.

It is understood that increased particle segregation is largely produced through the rise of the inclined plates and efficient classification achieved by the reflux effect of the fluidization fluid whereby said fluid can repeatedly fluidized into the plates particles of a certain size and/or density.

Generally the particles and vast majority of the fluidization fluid are introduced to the fluidization chamber as separate streams. Alternatively the particles are incorporated in the fluidization fluid which may for example be in the form of a slurry.

Each array of parallel, equally spaced plates forms a lamellae which acts as an inclined hydraulic screen causing the particles of different size or density ranges to locate into different zones within the chamber.

Typically there are provided a plurality of lamellae within the housing or fluidization chamber. In one embodiment the plates of adjacent lamellae stages are, in the direction of flow of the fluidization fluid, oriented differently whereby progressively slower settling particles pass each adjacent stage. For example, the plates may be longer, closer together and/or less steep in order to achieve this effect. In another embodiment the configuration of plates of adjacent stages is substantially the same for greater refinement of the separation process. It should be appreciated that other permutations of lamellae plate sequences and arrangements are within the scope of the present invention.

Typically, there is provided an uppermost lamellae designed to prevent particles from escaping the fluidization chamber together with much of the fluidization fluid. Thus, relatively fine particles can be removed or classified in a more concentrated form from beneath the uppermost lamellae.

It is believed that the system has the advantage of self-control. An increase in the feed rate does not require a change in the underflow rate to preserve the separation condition. Keeping the underflow rate constant will simply cause the suspension concentration to rise, which automatically changes the underflow solids rate to the right steady state level. The change in hindered settling will cause a slight change in the separation size, but this change will be substantially less than the change in the feed rate. The separation size for a given device is altered simply by changing the fluidization velocity.

A further advantage is the ease of underflow removal because of the high rate of fluidization made possible by the control achieved by the lamellae. Hence all particles (including those in the underflow) tend to be in a state of suspension.

Preferably the fluidization chamber or classifier housing is elongate and shaped generally square or cylindrical in cross section with the stages of lamellae plates spaced longitudinally along its length. More preferably the fluidization chamber or classifier housing is oriented upright with the fluidization fluid flowing generally upward. The cross sectional area of the chamber may vary from one stage to the next to alter the relative separation size.

Generally the plates are inclined. Additionally or alternatively the fluidization chamber may be inclined, or parts of the chamber may be inclined to follow the overall shape of the various stages of lamellae plates.

Advantageously, the step of passing the fluidization fluid through the classifier can involve alteration of the fluidization rate to promote segregation of the particles largely on the basis of density.

In one form of the invention the method or apparatus for segregating or classifying particles is performed as a batch operation. Alternatively the method or apparatus is operated in a continuous mode whereby the particles are continuously or intermittently added to the fluidization chamber or the classifier housing. In this case, the feed is separated into an underflow stream and, at least an overflow stream.

Generally the fluidization fluid is water or another liquid. Alternatively the fluidization fluid is a gas. The particles may be provided dry, or wet as a slurry.

The term "particles" is to be understood to include solids, liquid droplets, and air or other gas bubble.

Suspension removed from specific zones between sets of parallel plates will contain particles of a narrow size range. The system can be operated as a particle fractionator in the batch or continuous mode, separating a feed into multiple size fractions.

In order to achieve a better understanding of the nature of the present invention several preferred embodiments of an apparatus for and a method of segregation or classifying particles will now be described, by way of example only, with referance to the accompanying drawings in which:

DESCRIPTION OF THE PREFERRED EMBODIMENT

Figure 1:
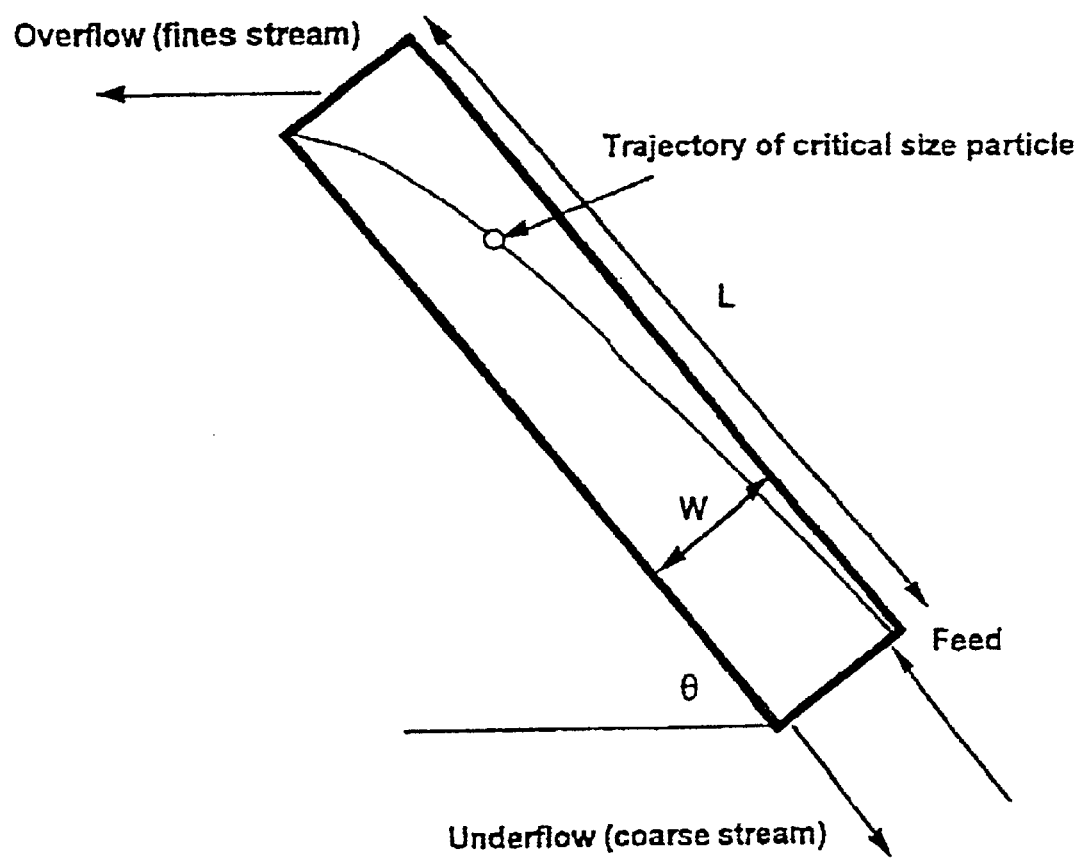
FIG. 1 is a diagrammatic representation of a known single layer inclined classifier.

By way of background theory a simple kinematic description of solids or particle classification in an inclined device will now be described. A schematic representation of a single plate inclined classifier is shown in FIG. 1. Feed solids or particles may enter near the base, producing fine solids or particles in the overflow, and course solids or particles in the underflow. The trajectory of a critical size particle which reports both to the underflow and the overflow is shown. The solid particles gradually settles towards the incline as it is carried upwards. Finer solids or particles will report to the overflow, and coarse solids or particles will slide down the incline to the underflow.

The fluid moves through the device at a velocity U, and hence arrives in a time, t=L/U, where L is the plate length. During this time the solid particle moves at a velocity $V\cos\theta$ normal to the incline, where V is the usual particle velocity, and $\theta$ is the angle with the horizontal. Assuming a width, W, between the plates, then $$V \cos \theta = W/t = WU/L$$

Therefore, the critical particle velocity is, $$V = WU/(L \cos \theta)$$

The value of V, at a given suspension concentration depends on the particle size, assuming the solid particle density is constant. This equation provides a basis for selecting the lamellae width, length and angle. Ideally, the angle should be about 60 degrees. Higher angles will not amplify the segregation a much. Lower angles may lead to build up of solids or particles on the incline.

Since the particle of velocity V can segregate against a fluid of velocity U, the sedimentation enhancement is given by the ratio of U/V. That is, $$U/V = L \cos \theta / W$$

and hence the increase in settling rate is given by the ratio of the projected settling area to the cross-sectional flow area. By inclining a vessel with a long length L and narrow width W significant rates of separation can be obtained. A lamellae consisting of many plates separated by a narrow gap W has the potential to increase throughputs many fold.

Figure 2:
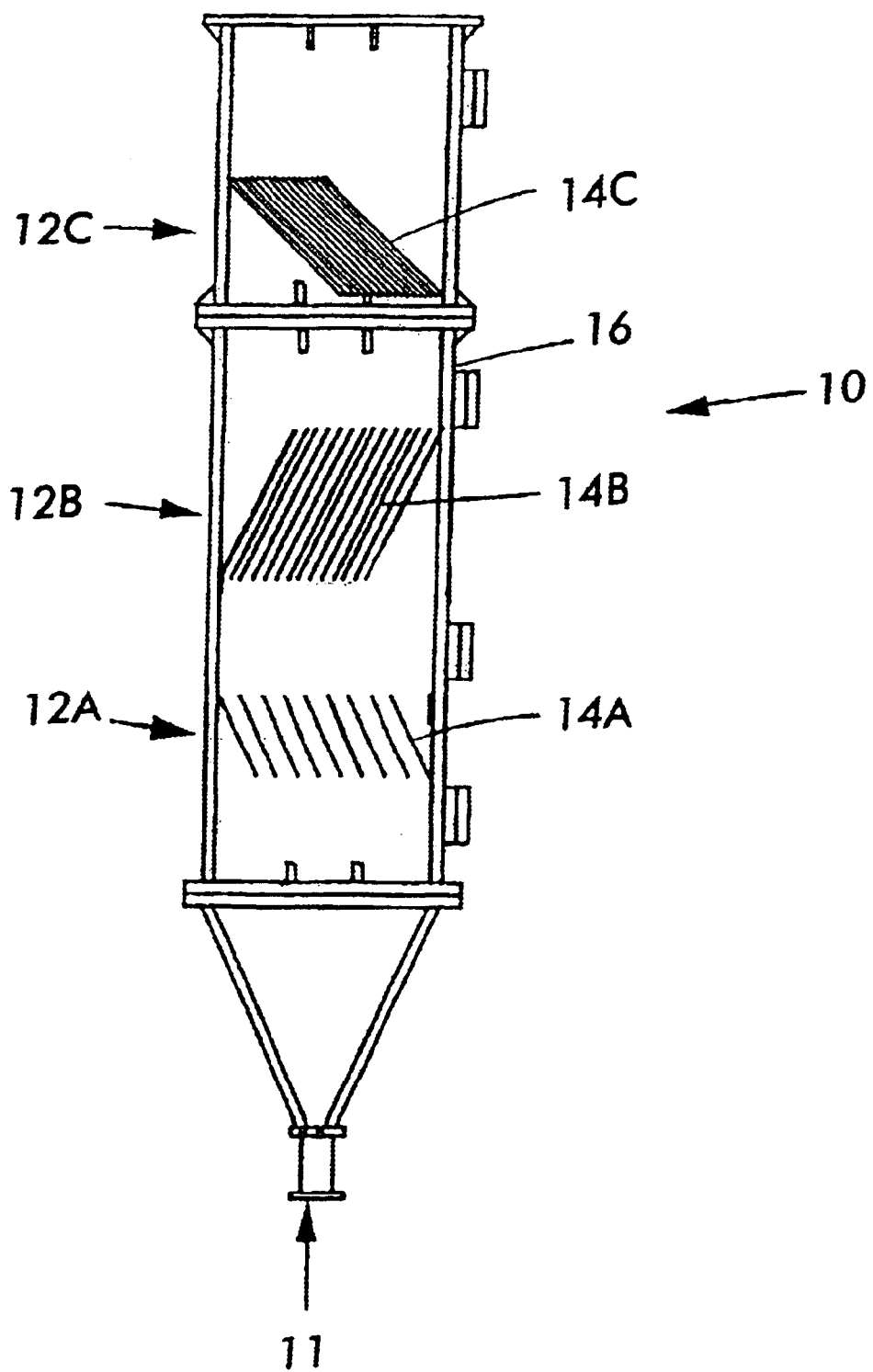
FIG. 2 is a diagrammatic vertical cross-section through one embodiment of a particle classifier according to the present invention operating in a batch mode.

A schematic representation of one embodiment of a particle classifier 10 operated in a batch mode is shown in FIG. 2. When the bed is fluidized by introducing a fluidization fluid at 11, solids or particles move upwards into arrays of plate lamellae 12A, 12B or 12C, and settle out on to the respective inclined plates 14A, 14B or 14C. The plate lamellae 12A, 12B or 12C are mounted within a fluidization chamber 16 which in this example is elongate and of a generally square cross-section. The finest grade of particle, however, passes up through. Some of the fine particles may deposit onto the inclined plates 14A, 14B or 14C and hence slide back down into a fluidized zone below the lamellae 12A, 12B or 12C. In time, these particles will again move up into the lamellae 12A, 12B or 12C and hence be given a second, third or subsequent chance to escape into the region above the lamellae 12A, 12B or 12C and hence the classifier operates as a reflux classifier. The fluidization process, therefore, helps to strip the suspension of the fine particles. The inclusion of the plate lamellae 12A, 12B or 12C into the fluidization chamber such as 16 to enhance segregation is an important feature of the invention. A common fluid velocity up through each of the channels formed between plates in a given lamellae is produced automatically because of the steady flow of the fluidization fluid, in this example water. This common velocity is important for achieving a sharp separation.

Once the particles move beyond the first stage of the plate lamellae 12A they then pass through a second lamellae 12B. This lamellae 12B consists, ideally, of longer plates 14B. The plates may also be oriented closer together or inclined with less of a gradient. Therefore, only the finest of the fine particles are capable of passing through the second stage 12B. Again, if these fine particles fail to past through on the first attempt, additional opportunities will be possible due largely to the reflux effect. Additional lamellae may also be positioned above, such as 12C, with zones in between which are free of lamellae. For example the final or uppermost lamellae, in this case 12C, can be employed to prevent ultrafine particles from escaping the fluidization chamber with the fluidization fluid.

The batch system will eventually produce a steady condition, with the finest particles trapped in the upper zones, and gradually coarser particles trapped in zones closer to the base. If the plate lamellae 12A, 12B and 12C were not used in the classifier 10. Some segregation would occur. However, the applicant has observed that particles covering a broad range of size tend to remain partially mixed in a conventional fluidized bed. Hence, in the absence of the plate lamellae a sharp separation may be difficult to achieve.

Figure 3:
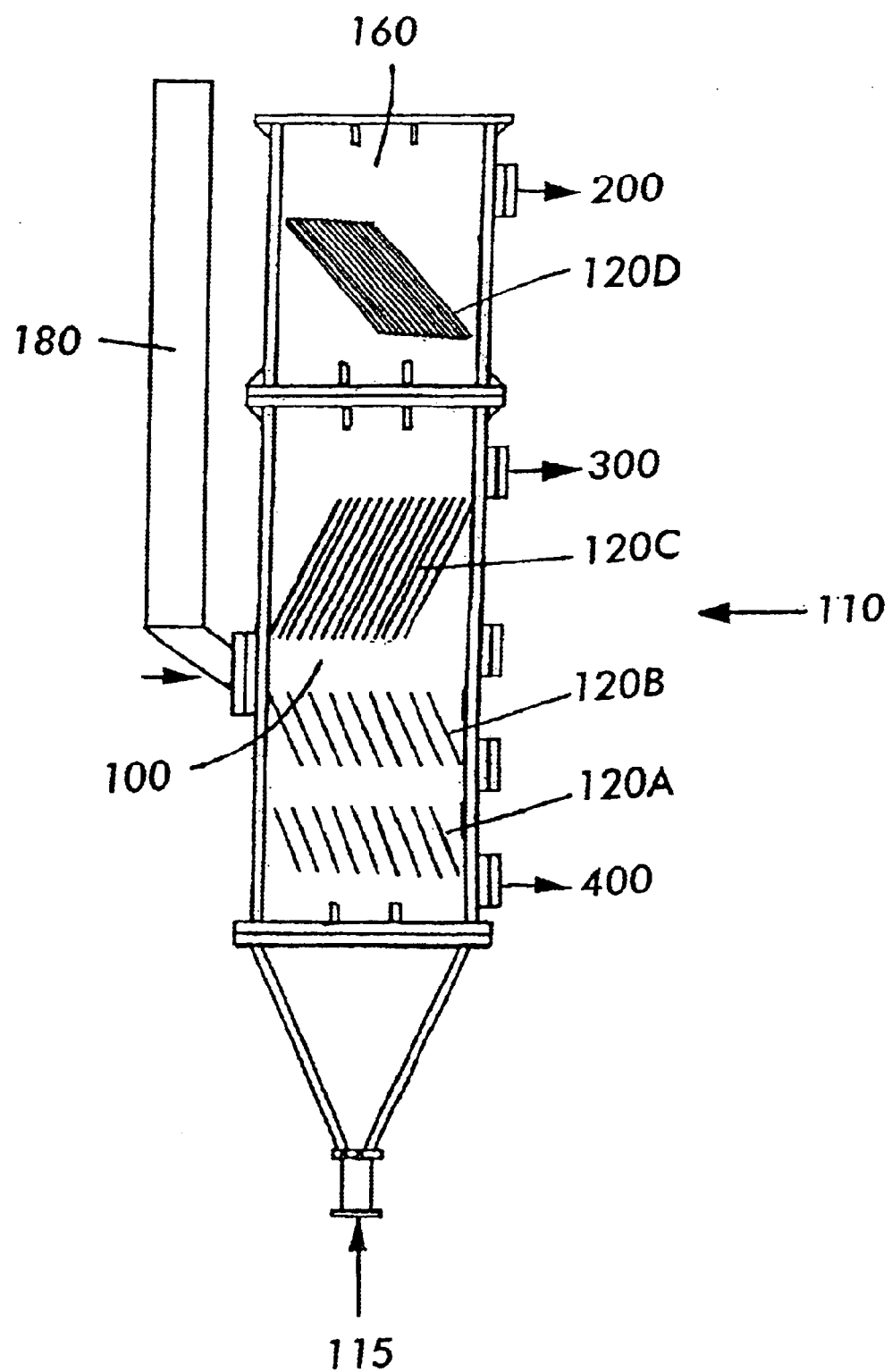
FIG. 3 is a diagrammatic vertical cross-section through another embodiment of a particle classifier according to the present invention operating in a continuous mode.

A schematic representation of another embodiment of the particle classifier operating in a continuous mode is shown at 110 in FIG. 3. The particle classifier is readily operated in a continuous fashion by providing a fluidization flow at 115 and pumping a particle feed slurry into an external feed well 180. An internal feed well may be preferred, but may be more difficult to incorporate because of the plate lamellae. The feed well 180 provides a means for disengaging unwanted entities such as air bubbles from the feed slurry. The feed slurry ideally plunges into the middle zone 100 of the classifier. In this embodiment plate lamellae 120C may be located above the feed entry position and a second stage lamellae 120B may be located below the feed entry position. For further refinement additional lamellae such as 120A and 120D may be used either side of the feed entry position. A lamellae free zone should exist between each set of lamellae 120A, B, C, and D. These zones classify via the reflux mechanism.

At the top of the fluidizing chamber 160 liquid containing the finer particles spill over into a launder (not shown) or are withdrawn via an outlet 200 for recovery in a separate vessel (not shown). Alternatively the solids leave in a more concentrated form at outlet 300 from the zone between 120C and 120D. The coarser particles suspended near the base are pumped away to another vessel (not depicted) via outlet 400. The separation size is governed by the fluidization rate, together with the plate length, L, angle, θ, and width, W, used in the lamellae.

In general, an increase in the suspension concentration below the plates results in higher concentrations within the plates, and hence segregation on the basis of density within the plates. With such segregation, it is possible to use the device to separate particles on the basis of density. Normally, the lower density particles will report to the overflow, and the higher density particles will report to the underflow. One way to achieve a higher concentration and hence promote this mode of operation is to operate using a relatively low underflow concentration In turn, the system naturally produces higher concentrations. The higher concentrations could also be achieved using lower fluidization velocities. Therefore, the device can also be used to separate particles on the basis of density.

It will be appreciated that solids or particles which are close to the separation condition have many opportunities to report to the correct position within the classifier such as 10 or 110. Further, the existence of plate lamellae such as 12 or 120 effectively amplifies the differences in particle velocities.

Figure 4:
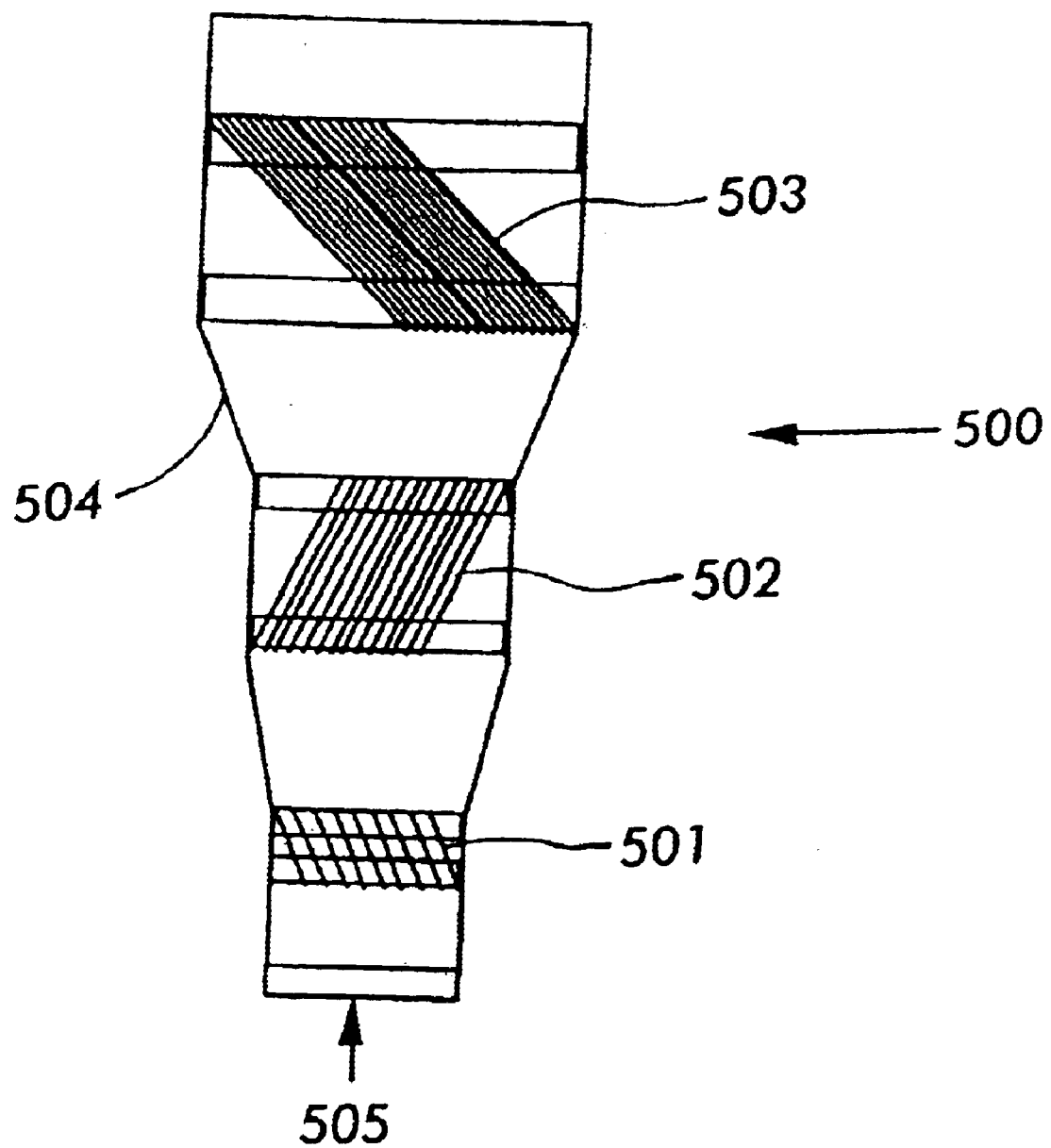
FIG. 4 is a diagrammatic vertical cross-section through an embodiment with a varying cross-section fluidization chamber.

Although the fluidization chamber has been described in the embodiments above as typically square in cross-section and of constant cross-section throughout its height, it is also possible to vary the shape and cross-section of the chamber in order to provide additional control. For example, in FIG. 4 there is shown a fluidization chamber 500 in which three arrays of lamellae 501, 502 and 503 are positioned in areas of the fluidization chamber 504 having differing cross-sections. By controlling the cross-section in this manner, the fluidization rate through each set of lamellae may be individually controlled even through there is a common fluidization rate supplied at 505 at the bottom of chamber.

Figure 5:
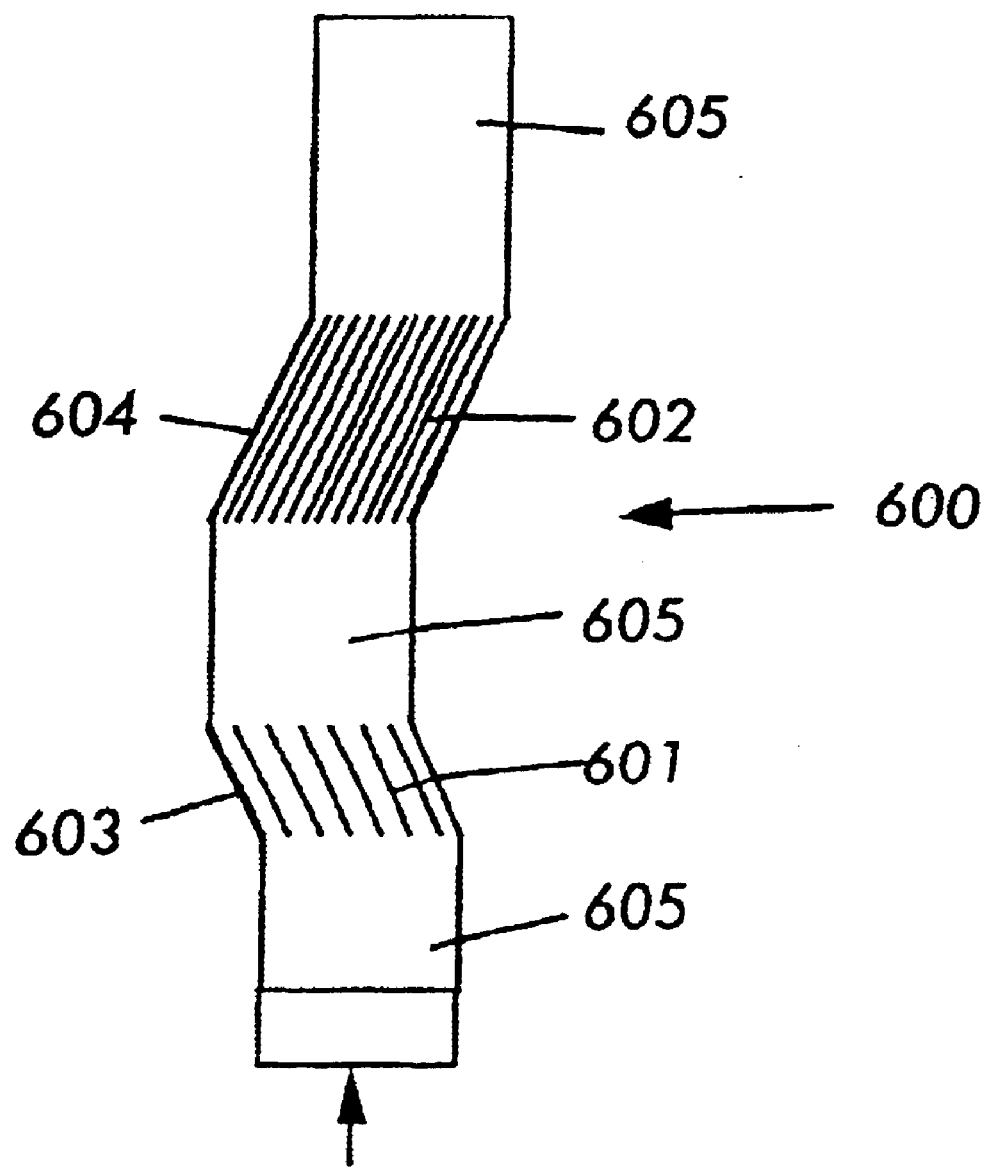
FIG. 5 is a diagrammatic vertical cross-section through an embodiment where chamber shape follows the lamellae.

FIG. 5 illustrates a further embodiment in which the fluidization chamber 600 incorporating arrays of lamellae 601 and 602 has angled side walls in the regions corresponding with the lamellae. For example the side walls in region 603 are angled to conform with the angle of inclination of the plates in lamellae 601, and similarly the side walls in region 604 are angled to correspond with the angle of inclination in lamellae 602. It is preferred that the zones 605 between lamellae remain with substantially vertical side walls. This configuration is particularly advantageous in reducing or eliminating any "dead" areas at either end of the lamellae between the inclined plates and the chamber walls.

The classifier and method of particles segregation or classification is suitable for feeds containing particles up to about 5 mm in diameter although larger particles could also be used. Ultrafine particles, less than 45 $\mu$m in diameter also separate effectively, assuming colloidal aggregation is not a problem. Further it is possible to classify particles into different distinct fractions using either batch or continuous conditions. For ultrafine particles, this is especially attractive. Hence the classifier and method of classification provide an excellent alternative to a conventional cyclosizer.

Those skilled in the art will appreciate that the invention described herein is susceptible to variations and modifications other than those specifically described. The classifier including a fluidization chamber may be of practically any configuration where essentially it operates as an elutriator or fluidized bed with the presence of one or more inclined plates typically arranged in one or more sets of lamellae. The method of segregation or classifying particles may also extend to the following applications:

i) the classification of particles less dense than the fluidization fluid where the described system operates in reverse with the fluidization fluid flowing downwards and the particles settling upwards;

ii) gas fluidization of relatively fine particles;

iii) the segregation or classification of liquid droplets or air bubbles such as that required in the draining of a foam in foam fractionation.

All such variations and modifications are to be considered within the scope of the present invention the nature of which is to be determined from the foregoing description.

What is claimed is:

1. A classifier for segregating particles by size or density, said classifier comprising:

a fluidization chamber adapted to contain a fluidized bed;

a fluidization device for providing a flow of fluidization fluid to enter into the fluidization chamber from below such that the fluidization fluid may flow upwardly in the chamber; and at least one array of inclined plates mounted within the fluidization chamber positioned such that in use, particles elutriated by the upwardly flowing fluidization fluid within the chamber flow upwardly into the array where the particles are caused to be segregated between the plates, and to report above or below the plates according to the size or density of the particles, the fluidization chamber having a plate-free zone immediately above and below the array.

2. A classifier as claimed in claim 1 wherein said array of inclined plates comprises an array of parallel equally spaced plates extending across said fluidization chamber so that the plates in the array do not form a stepped arrangement.

3. A classifier according to claim 1 wherein two or more arrays of inclined plates are provided, each array being vertically spaced from the or each other array, and the arrays dividing the fluidization chamber into zones.

4. A classifier as claimed in claim 3 wherein the length of each plate is an array, the angle of inclination of the plates, and the spacing between plates in that array are selected to enable particles of a predetermined size or density to pass through the array when elutriated at a predetermined rate by the fluidization fluid, while inhibiting particles of greater size or density from passing through the array.

5. A classifier as claimed in claim 1 wherein a feed fluid incorporating particles to be classified is fed into the fluidization chamber between two of the arrays of inclined plates.

6. A classifier as claimed in claim 1 wherein the particles are fed into the fluidization chamber with the fluidization fluid.

7. A classifier as claimed in claim 1, further comprising the fluidization chamber having a bottom region and an entrance for the fluidization fluid in the bottom region of the chamber.

8. A method of classifying particles by size or density, the method comprising the steps of:

providing a fluidized bed within a fluidization chamber in which is positioned at least one array of inclined plates that are parallel and immediately adjacent one another in a non-stepped manner, a plate-free zone being present above and below the array;

feeding the particles into the fluidized bed such that they flow upwardly into the array, for causing the particles to be segregated between the plates and to report above or below the plates according to the size or density of the particles; and withdrawing particles from the chamber at one or more predetermined locations.

9. A method as claimed in claim 8 wherein the chamber is provided with two or more arrays of said inclined plates, each array being vertically spaced from the or each other array thereby dividing the fluidization chamber into zones, and wherein the withdrawal of particles from the chamber comprises withdrawal from a selected one or more of said zones.

10. A method as claimed in claim 8 further comprising providing the said fluidized bed fluidization fluid at a predetermined rate selected to achieve selected separation of sizes or densities above and below the inclined plates, in combination with selecting sizes, inclination and spacings of the inclined plates.

* * * * *